US012730067B2

(12) United States Patent
Wang et al.

(10) Patent No.: US 12,730,067 B2
(45) Date of Patent: Sep. 8, 2026

(54) OPTICALLY TRANSPARENT AND QUASI-TRANSPARENT REFLECTARRAYS FOR 5G APPLICATIONS

(71) Applicant: BDCM A2 LLC, Dover, DE (US)

(72) Inventors: Yan Wang, Davis, CA (US); Taha Shahvirdi Dizaj Yekan, San Diego, CA (US); Safa Kanan Hadi Salman, Vista, CA (US)

(73) Assignee: BDCM A2 LLC, Dover, DE (US)

(*) Notice: Subject to any disclaimer, the term of this patent is extended or adjusted under 35 U.S.C. 154(b) by 1069 days.

(21) Appl. No.: 17/738,756

(22) Filed: May 6, 2022

(65) Prior Publication Data

US 2022/0260488 A1 Aug. 18, 2022

Related U.S. Application Data

(62) Division of application No. 16/685,910, filed on Nov. 15, 2019, now Pat. No. 11,346,779.

(60) Provisional application No. 62/768,019, filed on Nov. 15, 2018.

(51) Int. Cl.

| | |
|---|---|
| ***G01N 21/55*** | (2014.01) |
| ***B32B 17/10*** | (2006.01) |
| ***G02F 1/157*** | (2006.01) |
| ***H01Q 3/38*** | (2006.01) |
| ***H01Q 3/46*** | (2006.01) |
| ***H01Q 21/00*** | (2006.01) |

(52) U.S. Cl.

CPC ....... *G01N 21/55* (2013.01); *B32B 17/10055* (2013.01); *G02F 1/157* (2013.01); *H01Q 3/38* (2013.01); *H01Q 3/46* (2013.01); *H01Q 21/0018* (2013.01); *G01N 2021/558* (2013.01)

(58) Field of Classification Search

CPC ........ H01Q 21/0018; H01Q 3/38; H01Q 3/46; G01N 21/55; G02F 1/157; B32B 17/10055; B32B 17/10

See application file for complete search history.

(56) References Cited

U.S. PATENT DOCUMENTS

| | | | | |
|---|---|---|---|---|
| 8,595,994 | B1 | 12/2013 | Grommesh et al. | |
| 9,112,281 | B2 * | 8/2015 | Bresciani | H01Q 19/10 |
| 9,531,079 | B2 * | 12/2016 | Maruyama | H01Q 15/148 |
| 10,303,035 | B2 | 5/2019 | Brown et al. | |

(Continued)

OTHER PUBLICATIONS

A. Freni, et al., "Analysis and Design of a High-Gain Folded Reflectarray with Curved Polarizer," in 2018 IEEE International Symposium on Antennas and Propagation and USNC-URSI Radio Science Meeting, Boston, MA, USA, Jul. 2018.

(Continued)

*Primary Examiner* — Hai V Tran
(74) *Attorney, Agent, or Firm* — Dinsmore & Shohl LLP

(57) ABSTRACT

Examples disclosed herein relate to an Insulated Glass Unit ("IGU") to enhance wireless communications in a wireless network. The IGU has a first and a second glass layers, a first and a second spacers, and a first and a second ground planes, the first ground plane in contact with the first glass layer and the second ground plane in contact with the second glass layer. The IGU also includes a gas layer in between the first and the second ground planes, a reflectarray comprising a metastructure array of reflector elements, and a third glass layer on top of the metastructure reflectarray.

11 Claims, 19 Drawing Sheets

(56) References Cited

U.S. PATENT DOCUMENTS

| | | | | |
|---|---|---|---|---|
| 10,673,121 | B2 | 6/2020 | Hughes et al. | |
| 2009/0079645 | A1* | 3/2009 | Sotelo | H01Q 15/0046 343/912 |
| 2014/0085693 | A1* | 3/2014 | Mosallaei | G02B 1/002 359/107 |
| 2015/0205021 | A1* | 7/2015 | Howell | G02B 5/208 359/359 |
| 2020/0381839 | A1* | 12/2020 | Shahvirdi Dizaj Yekan | H01Q 15/0086 |
| 2021/0040789 | A1* | 2/2021 | Rozbicki | G02F 1/163 |
| 2021/0058137 | A1 | 2/2021 | Yekan et al. | |

OTHER PUBLICATIONS

T. Yekan, et al., "Design of Two Transparent X Band Reflectarray Antennas Integrated on a Satellite Panel," in 2016 IEEE International Symposium on Antennas and Propagation (APSURSI), Fajardo, PR, pp. 1413-1414, Jun. 2016.

T. Yekan, et al., "Examination of Two Types of Quasi Transparent Reflectarray Elements," in 2016 IEEE International Symposium on Antennas and Propagation (APSURSI), Fajardo, PR, pp. 1543-1544, Jun. 2016.

R. Leberer et al., "A Dual Planar Reflectarray With Synthesized Phase and Amplitude Distribution," in IEEE Transactions on Antennas and Propagation, vol. 53, No. 11, pp. 3534-3539, Nov. 2005.

D.M. Pozar, et al., "A Shaped-Beam Microstrip Patch Reflectarray," IEEE Transactions on Antennas and Propagation, vol. 47, No. 7, pp. 1167-1173, Jul. 1999.

E. Martinez-de-Rioja, et al., "Bifocal Design Procedure for Dual-Reflectarray Antennas in Offset Configurations," IEEE Antennas and Wireless Propagation Letters, vol. 17, No. 8, pp. 1421-1425, Aug. 2018.

E. Carrasco, "Demonstration of a Shaped Beam Reflectarray Using Aperture-Coupled Delay Lines for LMDS Central Station Antenna," in IEEE Transactions on Antennas and Propagation, vol. 53, No. 10, pp. 3103-3111, Oct. 2008.

G. Carluccio et al., "Design and Manufactur of Cosecant-Squared Complementary Reflectarrays for Low-Cost Applications" in IEEE Transactions on Antennas and Propagation, vol. 65, No. 10, pp. 5220-5227, Oct. 2010.

E. Carrasco, et al., "Design, Manufacture and Test of a Low-Cost Shaped-Beam Reflectarray Using a Single Layer of Varying-Sized Printed Dipoles," IEEE Transactions on Antennas and Propagation, vol. 61, No. 6, pp. 3077-3085, Jun. 2013.

Daniel R. Prado et al., "Efficient Crosspolar Optimization of Shaped-Beam Dual-Polarized Reflectarrays Using Full-Wave Analysis for the Antenna Element Characterization," IEEE Transactions on Antennas and Propagation, vol. 65, No. 2, pp. 623-635, Feb. 2017.

J.A. Zornoza, et al., "Folded Multilayer Microstrip Reflectarray With Shaped Pattern," IEEE Transactions on Antennas and Propagation, vol. 54, No. 2, pp. 510-518, Feb. 2006.

J. Shaker, et al., "Investigation of FSS-Backed Reflectarray Using Different Classes of Cell Elements," IEEE Transactions on Antennas and Propagation, vol. 56, No. 12, pp. 3700-3706, Dec. 2008.

E.R.F. Almajali, "Reflectarray Antennas: Operating Mechanisms, and Remedies for Problem Aspects," Ph.D. dissertation, School of Electrical Engineering and Computer Science, University of Ottawa, Ottawa, Canada, 2014.

A. Tamminen, et al., "Reflectarray Design for 120-GHz Radar Application: Measurement Results," IEEE Transactions on Antennas and Propagation, vol. 61, No. 10, pp. 5036-5047, Oct. 2013.

J.A. Encinar, et al., "Three-Layer Printed Reflectarrays for Contoured Beam Space Applications," IEEE Transactions on Antennas and Propagation, vol. 52, No. 5, pp. 1138-1148, May 2004.

T. Yekan, et al., "Transparent Reflectarray Antenna Printed on Solar Cells," in 2016 IEEE 43rd Photovoltaic Specialists Conference (PVSC), Portland, OR, pp. 2610-2612, 2016.

* cited by examiner

| | 3.4GHz | 3.5GHz | 3.6GHz | 3.7GHz | 3.8GHz |
|---|---|---|---|---|---|
| Peak gain angle | Θ=50+1, Φ=-30 | Θ=50, Φ=-30 | Θ=50-1.5, Φ=-30 | Θ=50-2.5, Φ=-30 | Θ=50-3.5, Φ=-30-1 |
| Gain at nominal angle | 13.62dB | 14.48dB | 14.84dB | 14.84dB | 14.48dB |
| SLL | -15.8dB | -18.2dB | -19.1dB | -19.8dB | -17.9dB |

| | 3.4GHz | 3.5GHz | 3.6GHz | 3.7GHz | 3.8GHz |
|---|---|---|---|---|---|
| Peak gain angle | Θ=50+2, Φ=-30 | Θ=50, Φ=-30 | Θ=50-1.5, Φ=-30 | Θ=50-2, Φ=-30 | Θ=50-4.5, Φ=-30-2 |
| Gain at nominal angle | 14.25dB | 14.83dB | 14.82dB | 14.19dB | 13.14dB |
| SLL | -17.9dB | -16.9dB | -15.9dB | -14.8dB | -12.5dB |

| | 3.4GHz | 3.5GHz | 3.6GHz | 3.7GHz | 3.8GHz |
|---|---|---|---|---|---|
| Peak gain angle | Θ=50+1, Φ=-30 | Θ=50, Φ=-30 | Θ=50-1.5, Φ=-30 | Θ=50-2.5, Φ=-30 | Θ=50-3.5, Φ=-30-2 |
| Gain at nominal angle | 14.45dB | 14.79dB | 14.88dB | 14.66dB | 14.39dB |
| SLL | -16dB | -18.7dB | -16.5dB | -12.8dB | -8.9dB |

OPTICALLY TRANSPARENT AND QUASI-TRANSPARENT REFLECTARRAYS FOR 5G APPLICATIONS

CROSS-REFERENCE TO RELATED APPLICATIONS

This application claims priority to U.S. Non-Provisional application Ser. No. 16/685,910, entitled "Optically Transparent and Quasi-Transparent Reflectarrays for 5G Applications," filed on Nov. 15, 2019, and incorporated herein by reference in its entirety; and claims priority to U.S. Provisional Application No. 62/768,019, entitled "Optically Transparent and Quasi-Transparent Reflectarrays for 5G Applications," filed on Nov. 15, 2018, and incorporated herein by reference in its entirety.

BACKGROUND

New generation wireless networks are increasingly becoming a necessity to accommodate user demands. Mobile data traffic continues to grow every year, challenging the wireless networks to provide greater speed, connect more devices, have lower latency, and transmit more and more data at once. Users now expect instant wireless connectivity regardless of the environment and circumstances, whether it is in an office building, a public space, an open preserve, or a vehicle. In response to these demands, a new wireless standard known as 5G has been designed for deployment in the near future. The 5G standard may operate at millimeter wave, which covers frequencies between 28 and 300 GHz. In the near term, the 5G standard may operate at a mid-band spectrum of 3.5 GHz (or in the extended C-band between 3-8 GHz) in the interest of global harmonization and opportunities for large scale deployment.

The millimeter wave spectrum provides narrow wavelengths in the range of ~1 to 10 millimeters that are susceptible to high atmospheric attenuation and have a short range (just over a kilometer). In millimeter wave systems, array antennas present several advantages in high gain and beam steerability. For dense-scattering areas, for example, street canyon, in-building and shopping malls, due to multipath, shadowing and geographical obstructions, blind spots may exist. For remote areas where the ranges are larger and sometimes extreme climatic events with heavy storms and winds are present, environmental conditions may prevent operators from using large array antennas. These and other challenges in providing millimeter wave wireless communications for 5G networks impose ambitious goals on system design, including the ability to generate desired beam forms at a controlled direction while avoiding interference among the many signals and structures of the surrounding environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout and wherein.

DETAILED DESCRIPTION

Optically transparent and quasi-transparent reflectarrays for 5G applications are disclosed. The reflectarrays are attached to or integrated with a glass unit to enable enhanced communications in wireless networks, such as those operating in the extended C-band and mm-wave spectrum, including 5G applications in the 3.5, 4.2, 28, 39, and 60 GHz range, among others. In various examples, the reflectarrays reflect radio waves in a desired direction to reach wireless devices and user equipment ("UE") that are operational in simple or complicated environments, including remote areas, outdoors with obstructing structures (e.g., skyscrapers, buildings, trees, etc.) and non-line-of-sight areas and indoors with walls and constructs.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
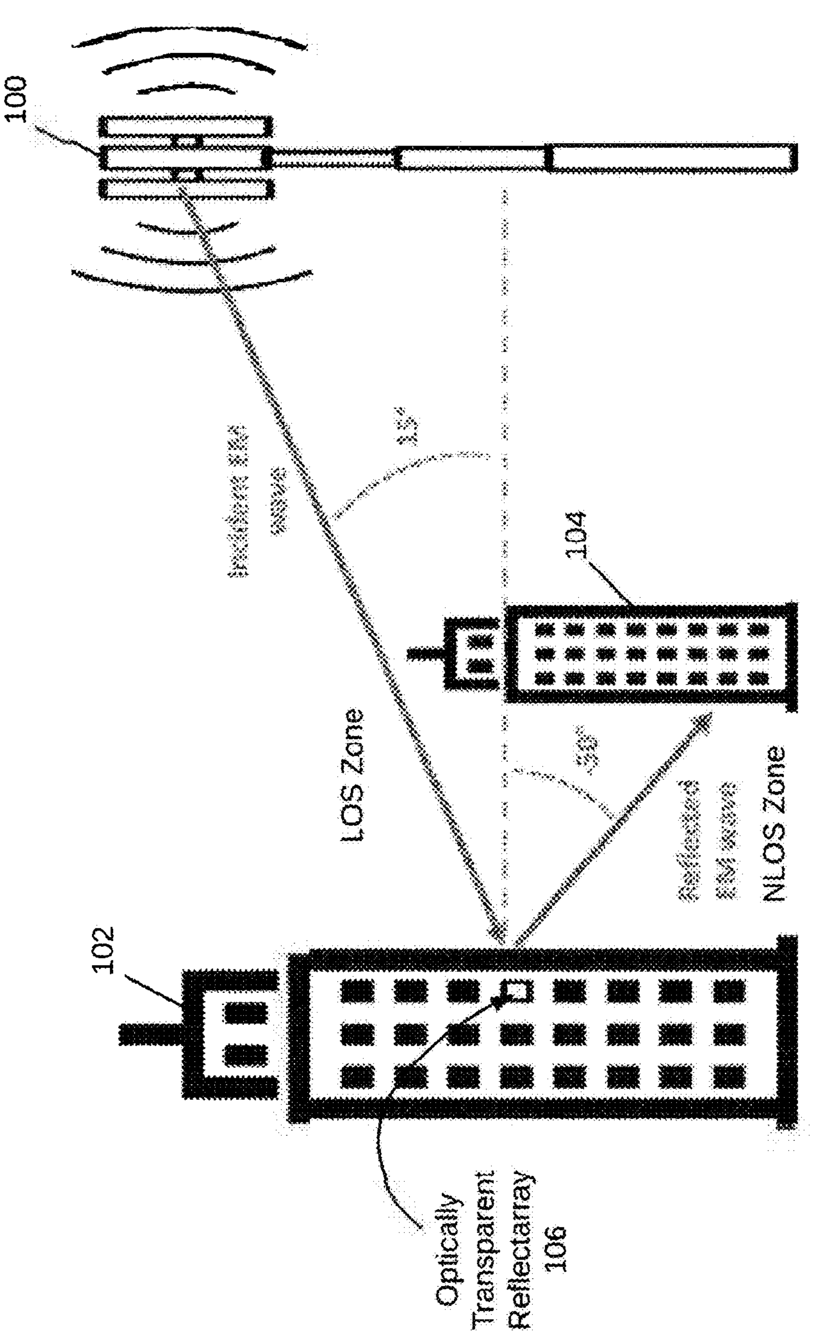
FIG. 1 is a schematic diagram of an application for optically transparent and quasi-transparent reflectarrays in accordance with various examples.

FIG. 1 illustrates a schematic diagram of an application for optically transparent and quasi-transparent reflectarrays in accordance with various examples. Wireless base station ("BS") 100 transmits and receives wireless signals from mobile devices within its coverage area. The coverage area may be disrupted by buildings or other structures in the environment, thereby affecting the quality of the wireless signals. In the illustrated example, buildings 102 and 104 affect the coverage area of base station 100 such that it has a Line-of-Sight ("LOS") zone. Users of devices outside of this zone may have either no wireless access, significantly reduced coverage, or impaired coverage of some sort.

Wireless coverage can, however, be improved to users outside of the LOS zone by the installation of an optically transparent or a quasi-transparent reflectarray 106 on a glass window of building 102. Reflectarray 106 is a robust and low cost relay that is positioned as illustrated between BS 100 and a user equipment ("UE") (e.g., a UE in building 104) to optimize network coverage. As illustrated, reflectarray 106 is formed, placed, configured, embedded, or otherwise connected to a portion of building 102, such as its glass windows. The glass windows may be Insulated Glass Units ("IGUs") that combine multiple glass panels into a single window system for better energy efficiency, safety and noise management. The location of reflectarray 106 may be in the upper or lower part of the windows away from users' or building dwellers' field of view. Although a single reflectarray 106 is shown for illustration purposes, multiple such reflectarrays may be placed in the windows of building 102 (and building 104) as desired.

Reflectarray 106 is a transparent or quasi-transparent reflectarray that is able to act as a relay between base station 100 and users outside of its LOS zone. Users in a Non-Line-of-Sight ("NLOS") zone are able to receive wireless signals from the BS 100 that are reflected off the reflectarray 106. In various examples, reflectarray 106 is a metastructure having an array of reflector elements. A metastructure, as generally defined herein, is an engineered structure capable of controlling and manipulating incident radiation (in this case, incident radiation from base station 100) at a desired direction based on its geometry. A reflector element on a metastructure may be composed of multiple microstrips, gaps, patches, vias, and so forth. Various configurations, shapes, designs and dimensions may be used to implement specific designs and meet specific constraints.

Figure 2:
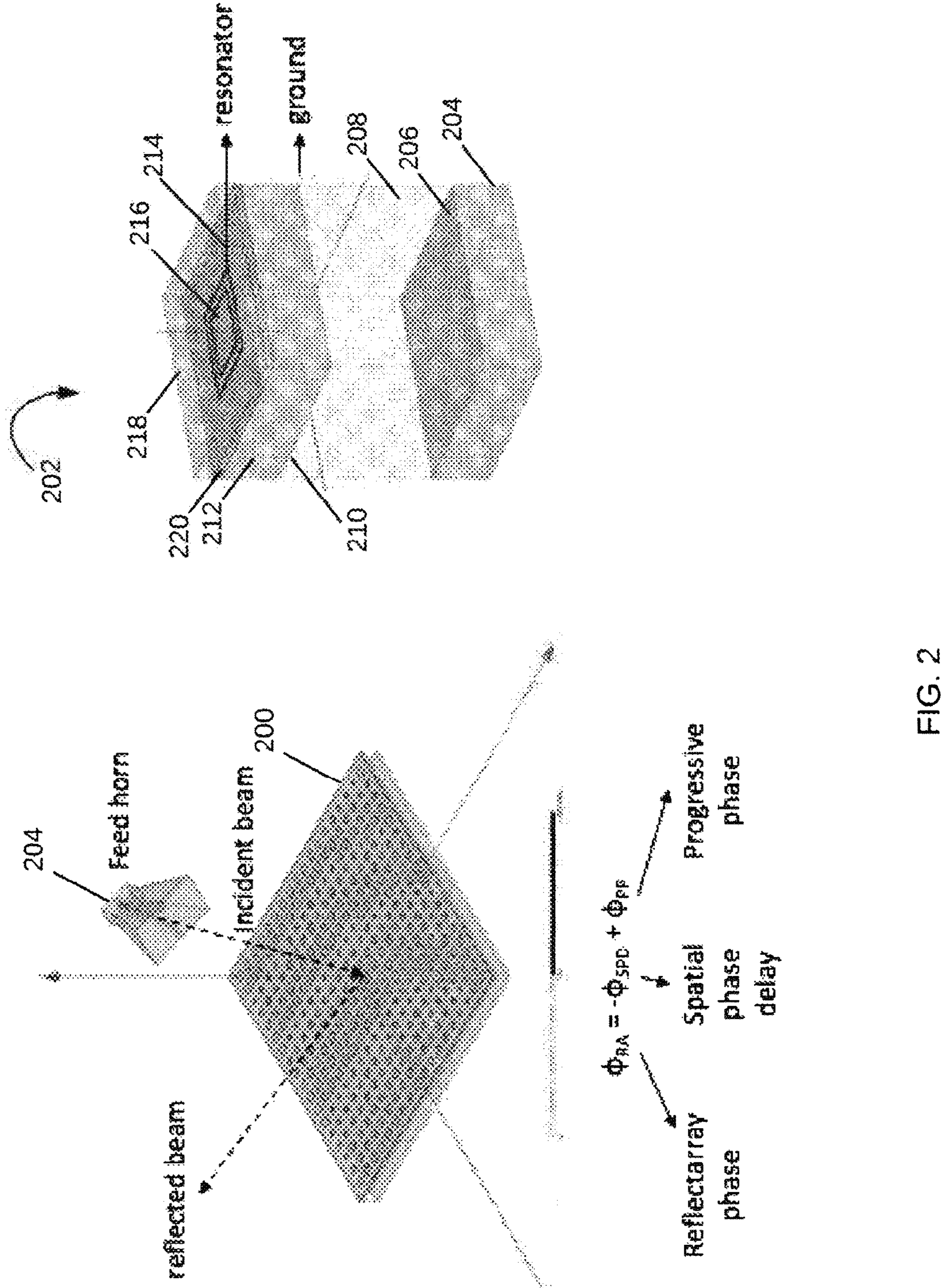
FIG. 2 is a schematic diagram of a reflectarray system in accordance with various examples.

FIG. 2 illustrates an example of a reflectarray system in accordance with various examples. Reflectarray 200 is a metastructure having a planar reflector array of reflector elements 202. Incident beams from a feed antenna 204 are received by the reflectarray 200 and reflected at a given phase and direction. In the example illustrated in FIG. 1, the feed antenna 204 is BS 100. As the surface of the reflectarray 200 is located in the far field of the feed antenna 204, the incident RF signals can be considered to be a wave arriving at a certain angle of incidence and having a spatial phase delay. Here, the angle of incidence can be considered to be the same for all reflector elements 202 in reflectarray 200 as the BS 100 is located at a far distance.

The individual reflector elements 202 of reflectarray 200 have to be designed such that they receive the incident beam from feed antenna 204 and reflect it into a planar wave front. The planar wave front is a combination of the reflected waves from the individual reflector elements 202. The reflection phase from each individual element in the reflectarray 200 depends on the spatial phase delay of feed antenna 204 and on a progressive phase shift in the field reflected by the individual reflector elements 202. The progressive phase shift across the individual reflector elements 202 results in a reflected beam pointing towards a specific direction. The local phase of each individual reflector element 202 can be determined by adjusting one or more geometrical parameters of each reflector element 202. As described in more detail below, once a desired phase distribution for the reflectarray 200 is determined, the geometry of each reflector element 202 can be optimized to provide the required phase value.

An example reflector element 202 for an IGU is illustrated as a patch with a surrounding loop on top of the IGU. Reflector element 202 is formed of glass layers 204 and 212, with a gas layer 208 in between. Ground planes 206 and 210 are placed in contact with the glass layers 204 and 212, respectively, to isolate and seal the gas layer 208. Patch 216 is placed on a PVB layer 220 and occupies very little surface area and offers high transparency as it can be fabricated with silver films. A glass layer 218 is placed on top of patch 216 to prevent exposing the path 216 and the ground plane 210 to air, which leads to oxidation.

In a fully transparent configuration operating at 3.5 GHz, patch 216 can be a 15 nm silver film on invisible glazing glass. In a quasi-transparent configuration, patch 216 can be a 10 μm silver film with visible printing. The metal loop can provide sharper resonance and even a larger phase range as compared to a single patch, at the expense of more reflection loss. Ground planes 206 and 210 can be replaced with a Frequency Selective Surface ("FSS") in various examples to allow for additional optical transparency. It is noted that increasing the thickness of the resonant patches' substrate reduces their reflection loss and decreases their phase range. It is also noted that decreasing the size of patch 216 reduces its reflection loss at the expense of a decreased phase range.

Figure 3:
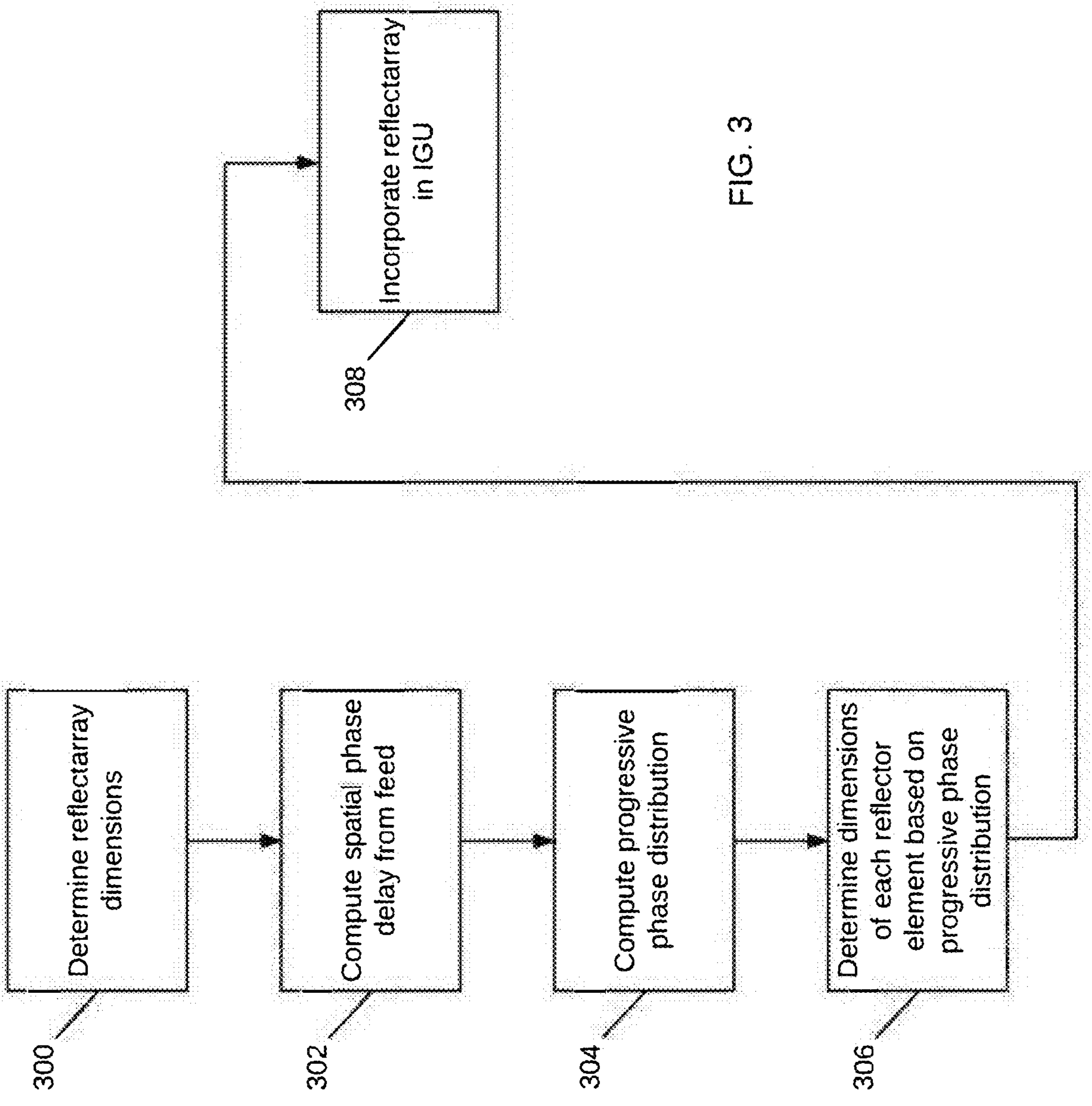
FIG. 3 is a flowchart for designing a reflectarray for use in an IGU in accordance with various examples.

Attention is now directed to FIG. 3, which is a flowchart for designing a reflectarray for use in an IGU in accordance with various examples. The first step is to determine the dimensions of the reflectarray, which will depend on the dimensions of the IGU and whether the reflectarray is to be attached or retrofitted to an existing IGU or manufactured together with the IGU using the same manufacturing process (300). Once the reflectarray dimensions are determined, the next step is to determine the placement of the reflectarray relative to the feed antenna, e.g., relative to a BS in a 5G application as in FIG. 1, and compute the spatial delay from that feed antenna (302).

A progressive phase distribution to be achieved by the reflectarray is then determined based on that delay and the requirements of the specific application guiding the desired direction and phase for beams reflected off the reflectarray (304). Once the progressive phase distribution is set, the dimensions of each reflector element are determined via a look-up table that pairs the element's dimensions to its local phase needed to achieve the desired progressive phase distribution (306). Note that each reflector element may be of a different or same size as other elements in the array. In some examples, the reflector elements may also be of different shapes or different types, e.g., rectangular, square, single patch, loop, etc., as desired.

Figure 4:
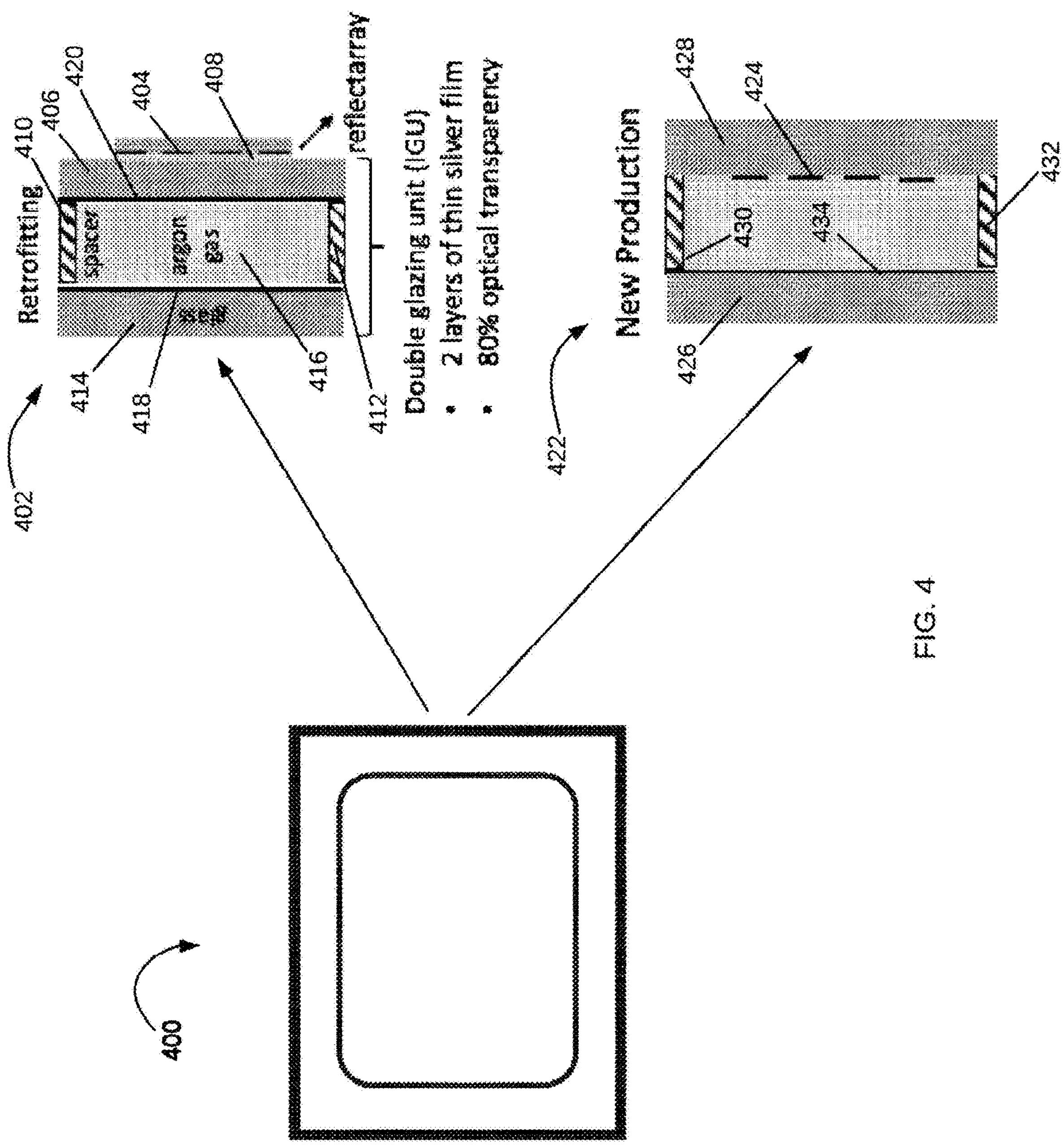
FIG. 4 is a schematic diagram showing two different scenarios for incorporating a reflectarray in an IGU in accordance with various examples.

The last step is to incorporate the reflectarray in the IGU, either through retrofitting to an existing IGU or through joint manufacturing (308). FIG. 4 illustrates a schematic diagram showing the two different scenarios for incorporating a reflectarray in IGU 400. In the retrofitting scenario of IGU 402, the reflectarray 404 is attached to the glass layer 406 through contact with PVB layer 408. Spacers 410-412 separate the two glass layers 406 and 414 from the gas layer 416, which in this example is an argon gas layer. In some examples, spacers 410-412 contain a drying agent to remove any moisture trapped in the gas layer 416 and prevent condensation in the glass layers 406 and 414 that can reduce performance. IGU 402 also contains two ground layers 418-420, which in this example are formed by a thin silver film to result in an overall optical transparency of around 80%. In the joint manufacturing scenario of IGU 422, the reflectarray 424 is built directly into the IGU and replaces one of the ground layers. Similar to IGU 402, IGU 422 also has two glass layers 426-428, two spacers 430-432 and in this case, one ground layer 434.

Figure 5:
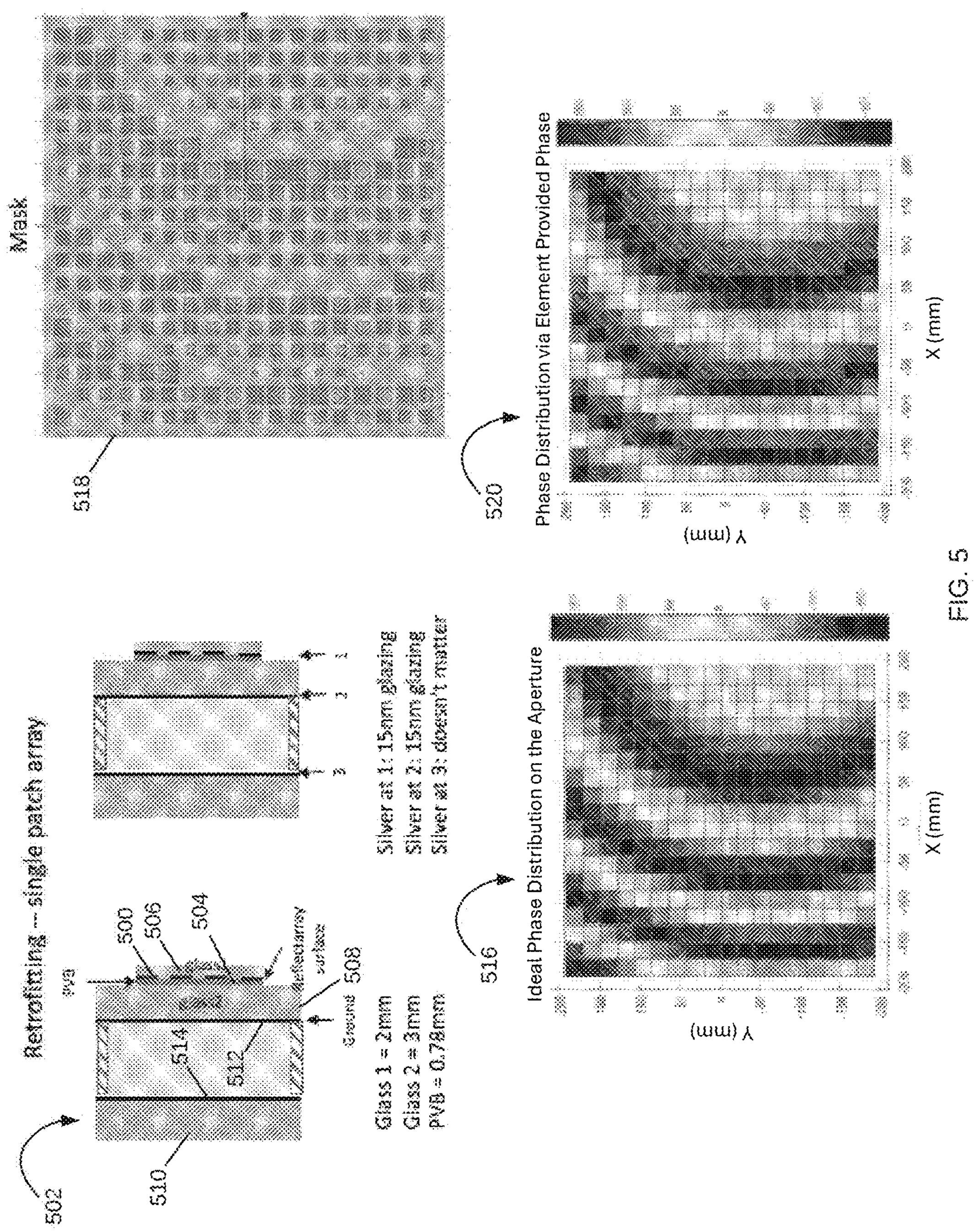
FIG. 5 is a schematic diagram of a reflectarray retrofitted into an IGU in accordance with various examples.

Attention is now directed to FIG. 5, which shows a schematic diagram of a reflectarray retrofitted into an IGU in accordance with various examples. Reflectarray 500 is attached to IGU 502 via PVB layer 504 for 3.5 GHz applications. Glass layer 506 on top of reflectarray 500 is designed to be 2 mm, while glass layers 508-510 are at 3 mm. The PVB layer 504 is at 0.78 mm. The reflectarray 500 is a very thin silver film glazing at 15 nm. Ground layer 512 can also be set at 15 nm, while ground layer 514 can be slightly different. Note that these values are just an example and different dimensions may be selected in other configurations and applications.

Figure 6:
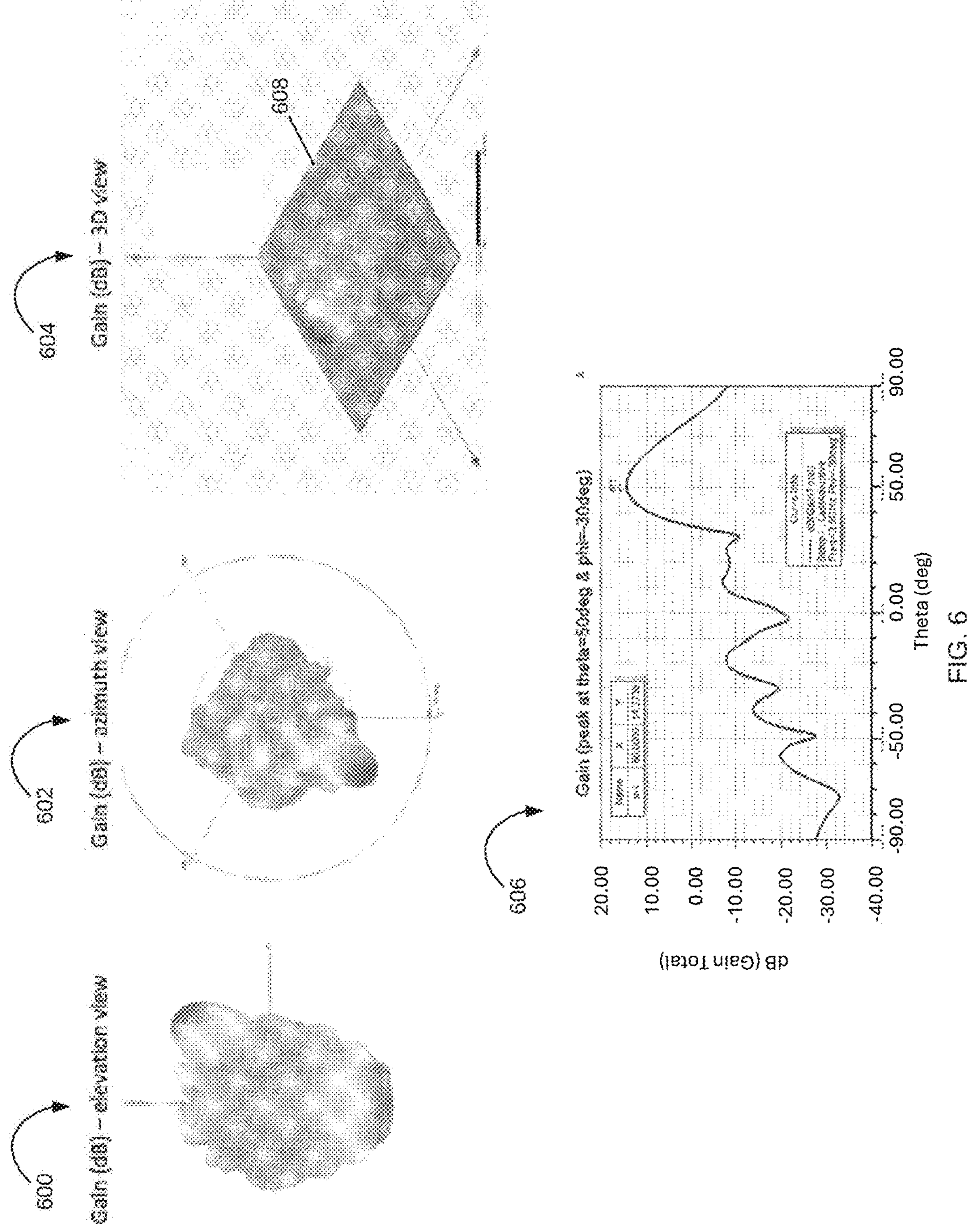
FIG. 6 are graphs of the gain of the reflectarray of FIG. 5.
Figure 7:
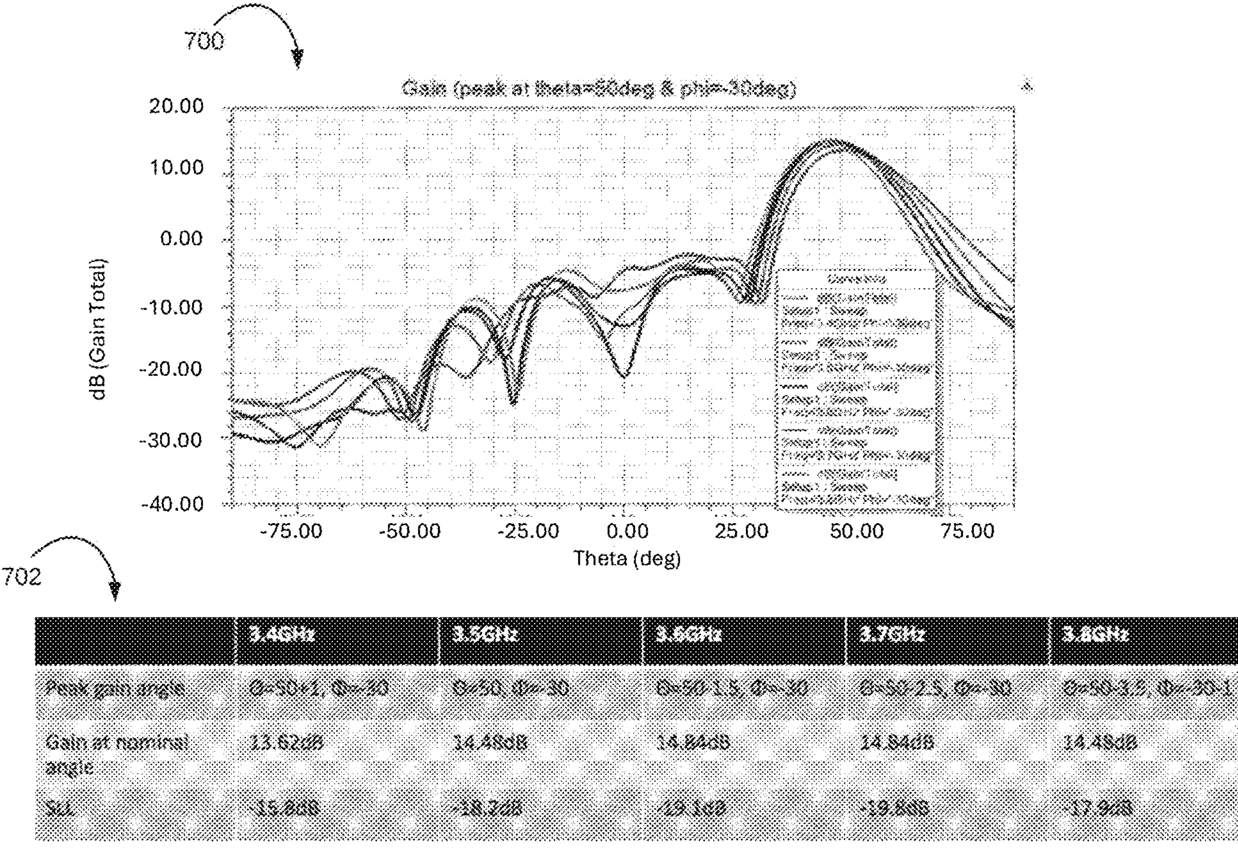
FIG. 7 are graphs of the peak gain location (both elevation and azimuth) and bandwidth performance of the reflectarray of FIG. 5.
Figure 8:
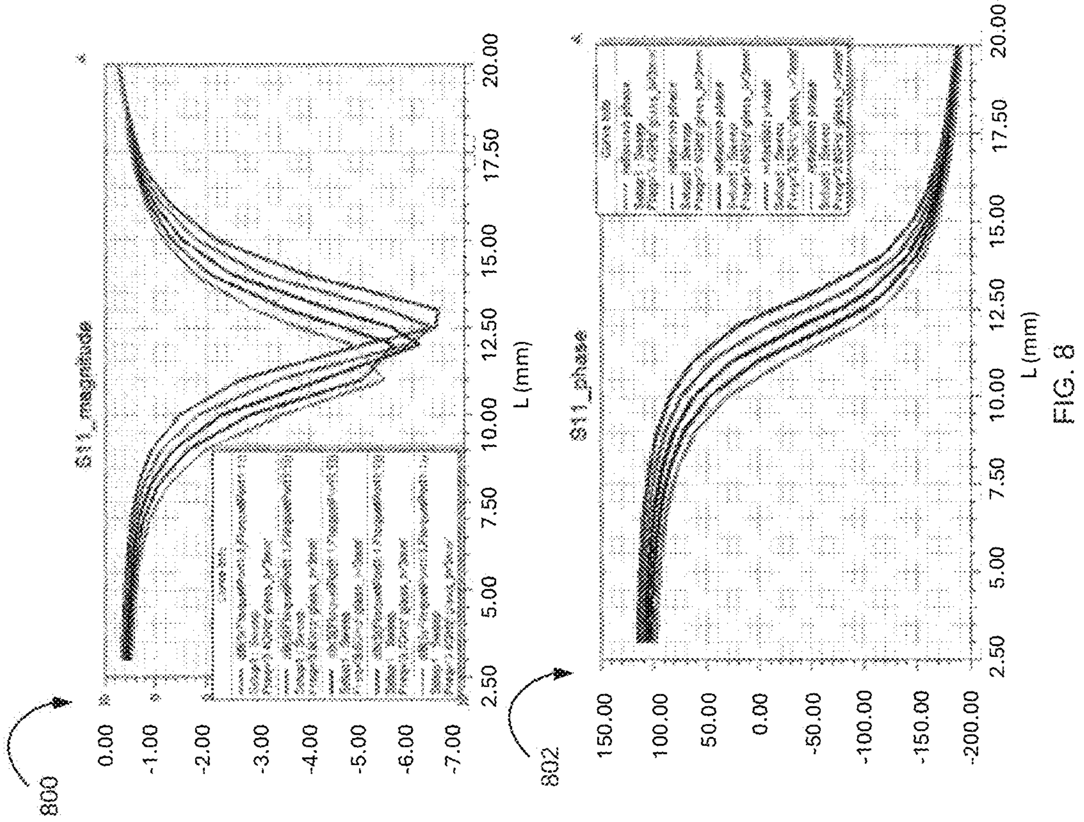
FIG. 8 are graphs showing the frequency variation of the reflection magnitude and phase of a reflector element in the reflectarray of FIG. 5.

The dimensions of the reflector elements in reflectarray 500 are designed based on a desired progressive phase distribution 516. A mask 518 is determined by a look-up table of local phase values achievable with each dimension of a square patch as in this example. Mask 518 results in a phase distribution 520 that matches the desired phase distribution 516. FIG. 6 shows the gain of reflectarray 500 in elevation (600), azimuth (602) and in a 3D 604 view superimposed with the reflector elements 608. Graph 606 shows the gain per phase and FIG. 7 shows the peak gain location of reflectarray 500 for both elevation and azimuth in graph 700 and bandwidth performance in graph 702. FIG. 8 shows the frequency variation of the reflection magnitude (800) and phase (802) of a reflector element in the reflectarray 500.

Figure 9:
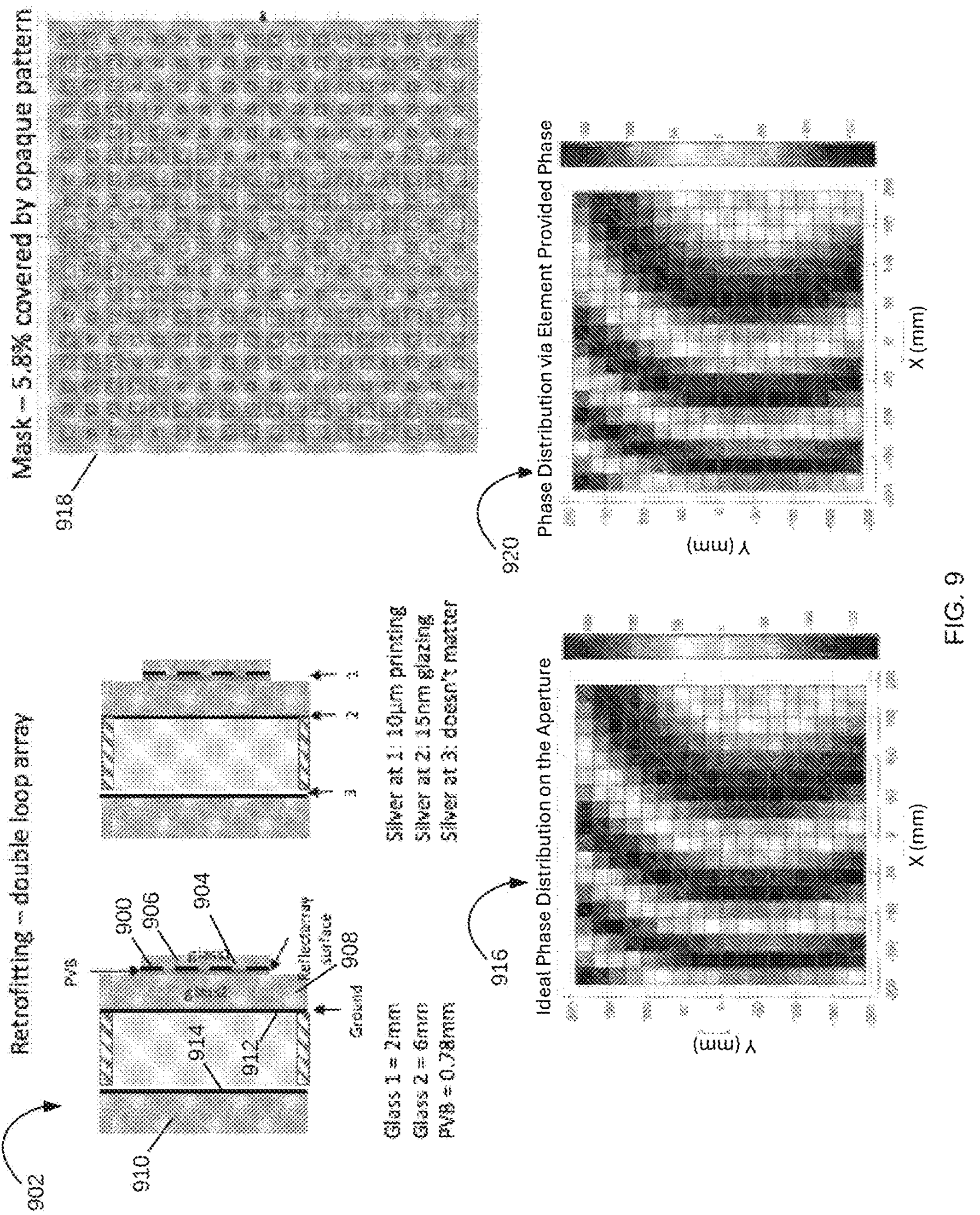
FIG. 9 is a schematic diagram of another reflectarray retrofitted into an IGU in accordance with various examples.

Another example of a retrofitted reflectarray is shown in FIG. 9. Reflectarray 900 is attached to IGU 902 via PVB layer 904 for 3.5 GHz applications. Glass layer 906 on top of reflectarray 900 is designed to be 2 mm, while glass layers 908-910 are at 6 mm. The PVB layer 904 is at 0.78 mm. The reflectarray 900 is a very thin silver film printing at 10 μm. Ground layer 912 is set at 15 nm glazing, while ground layer 914 can be slightly different. Note that these values are just an example and different dimensions may be selected in other configurations and applications.

Figure 10:
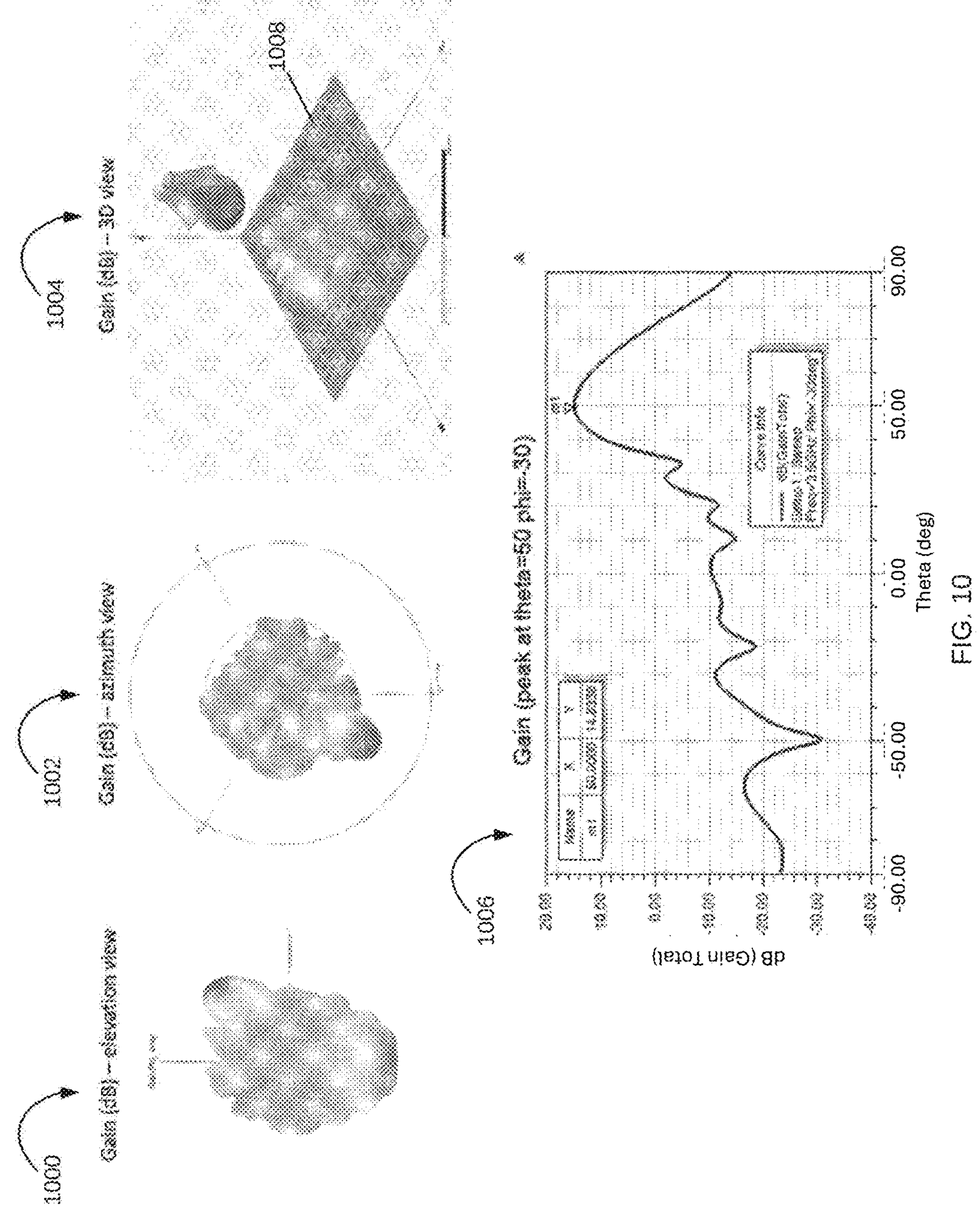
FIG. 10 are graphs of the gain of the reflectarray of FIG. 9.
Figure 11:
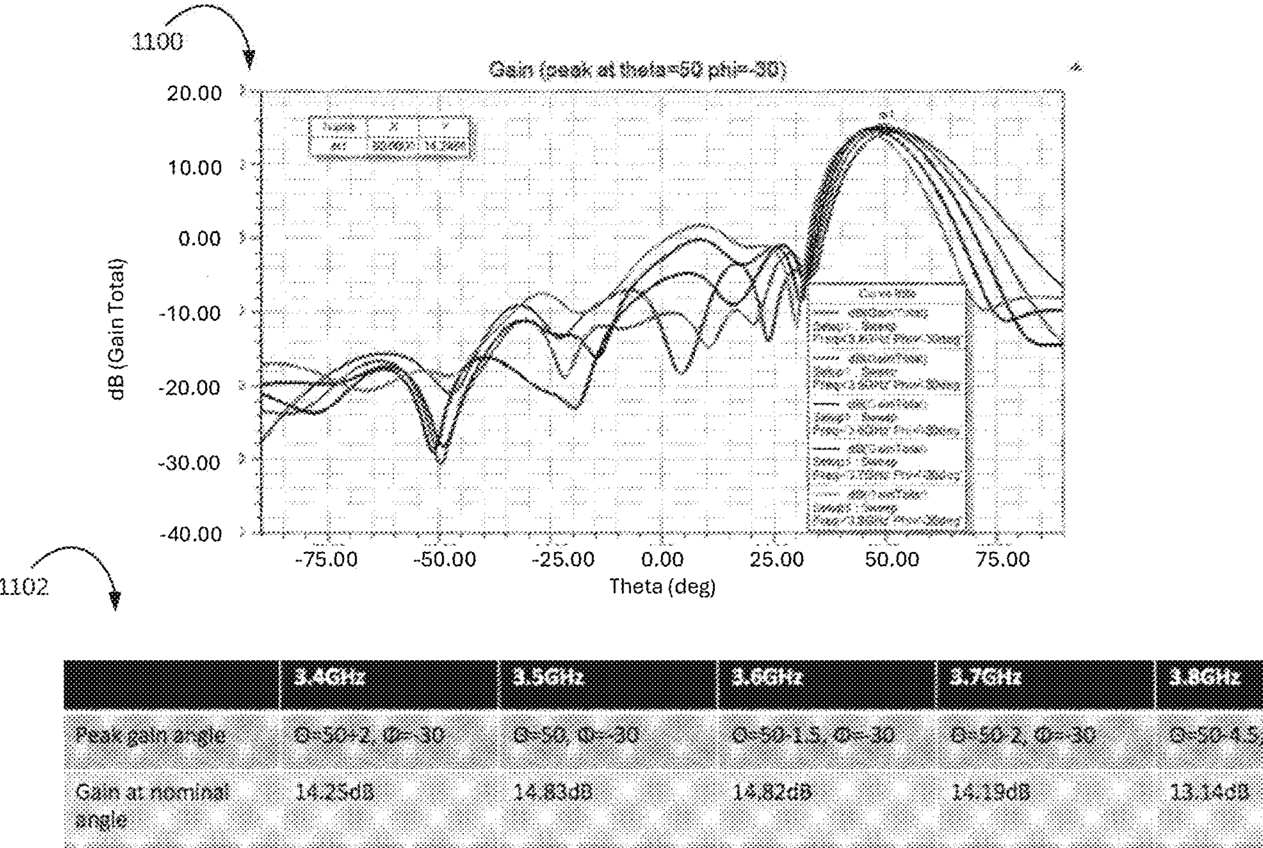
FIG. 11 are graphs of the peak gain location (both elevation and azimuth) and bandwidth performance of the reflectarray of FIG. 9.
Figure 12:
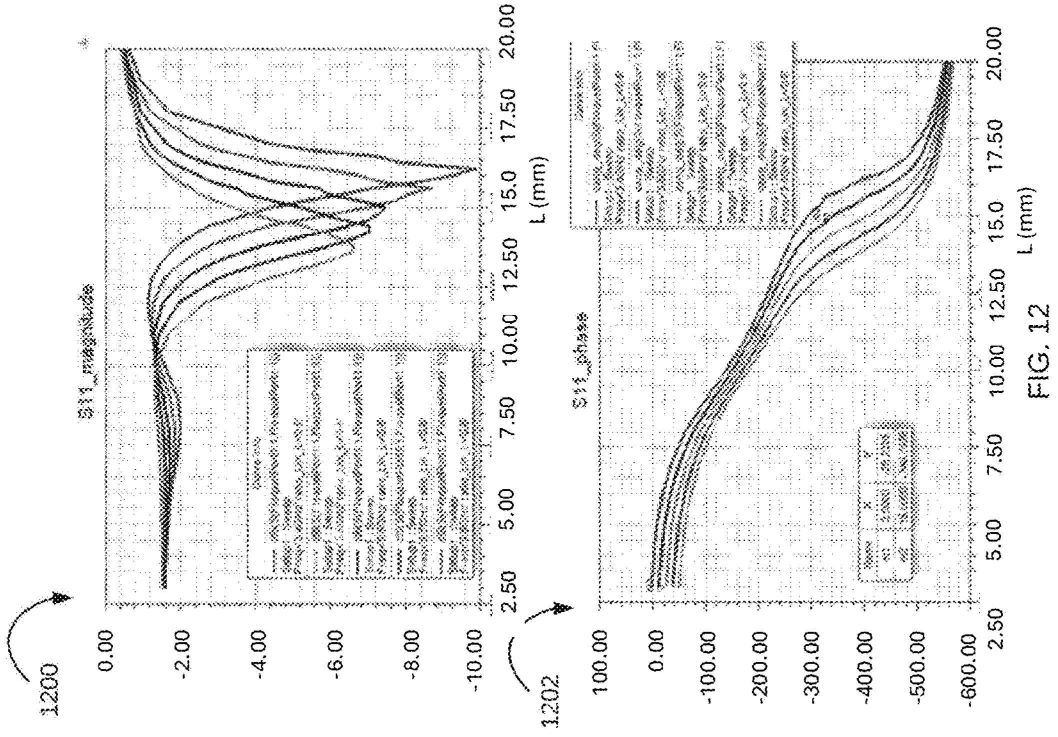
FIG. 12 are graphs showing the frequency variation of the reflection magnitude and phase of a reflector element in the reflectarray of FIG. 9.

Reflectarray 900 has reflector elements that are double loop elements, in contrast to the single patches in reflectarray 500 of FIG. 5. The dimensions of the reflector elements in reflectarray 900 are designed based on a desired progressive phase distribution 916. A mask 918 is determined by a look-up table of local phase values achievable with each dimension of a square patch as in this example. Mask 918 results in a phase distribution 920 that matches the desired phase distribution 916. In this case, 5.8% of the mask is covered by an opaque pattern, resulting in a slightly reduced transparency as compared to reflectarray 500. FIG. 10 shows the gain of reflectarray 900 in elevation (1000), azimuth (1002) and in a 3D 1004 view superimposed with the reflector elements 1008. Graph 1006 shows the gain per phase and FIG. 11 shows the peak gain location of reflectarray 900 for both elevation and azimuth in graph 1100 and bandwidth performance in graph 1102. FIG. 12 shows the frequency variation of the reflection magnitude (1200) and phase (1202) of a reflector element in the reflectarray 900.

Figure 13:
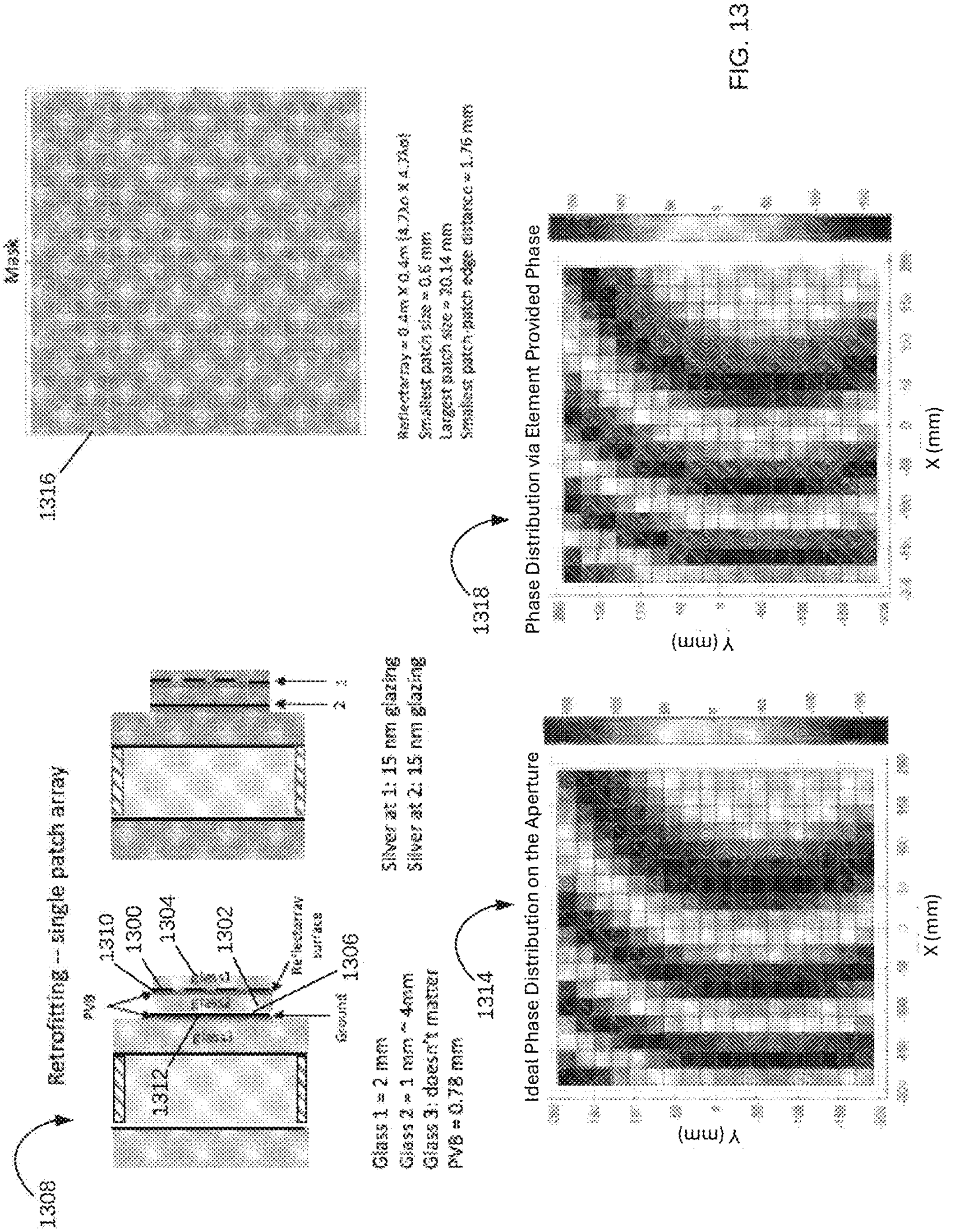
FIG. 13 is a schematic diagram of another reflectarray retrofitted into an IGU in accordance with various examples.

Attention is now directed to FIG. 13, which shows another example of a retrofitted reflectarray. Reflectarray 1300, in contrast to reflectarrays 500 of FIG. 5 and 900 of FIG. 9, has an extra layer of glass 1302 with glazed silver as its ground plane 1304. The advantage of reflectarray 1300 over reflectarrays 500 and 900 is that the reflectarray 1300 is fully independent of the glass thickness of the existing double-glazing panel and can be universally retrofitted on any existing glass panel at the expense of slightly increased thickness. The extra glass layer 1302 is designed to be a thin glass layer in the 1 to 4 mm range, glass layer 1304 is at 2 mm, and glass layer 1306 can be predetermined on manufacturing of the IGU 1308. Two PVB layers 1310-1312 are included and set at 0.78 mm. The reflectarray 1300 itself and ground plane 1304 are both a very thin silver film glazing at 15 nm. Note that these values are just an example and different dimensions may be selected in other configurations and applications.

Figure 14:
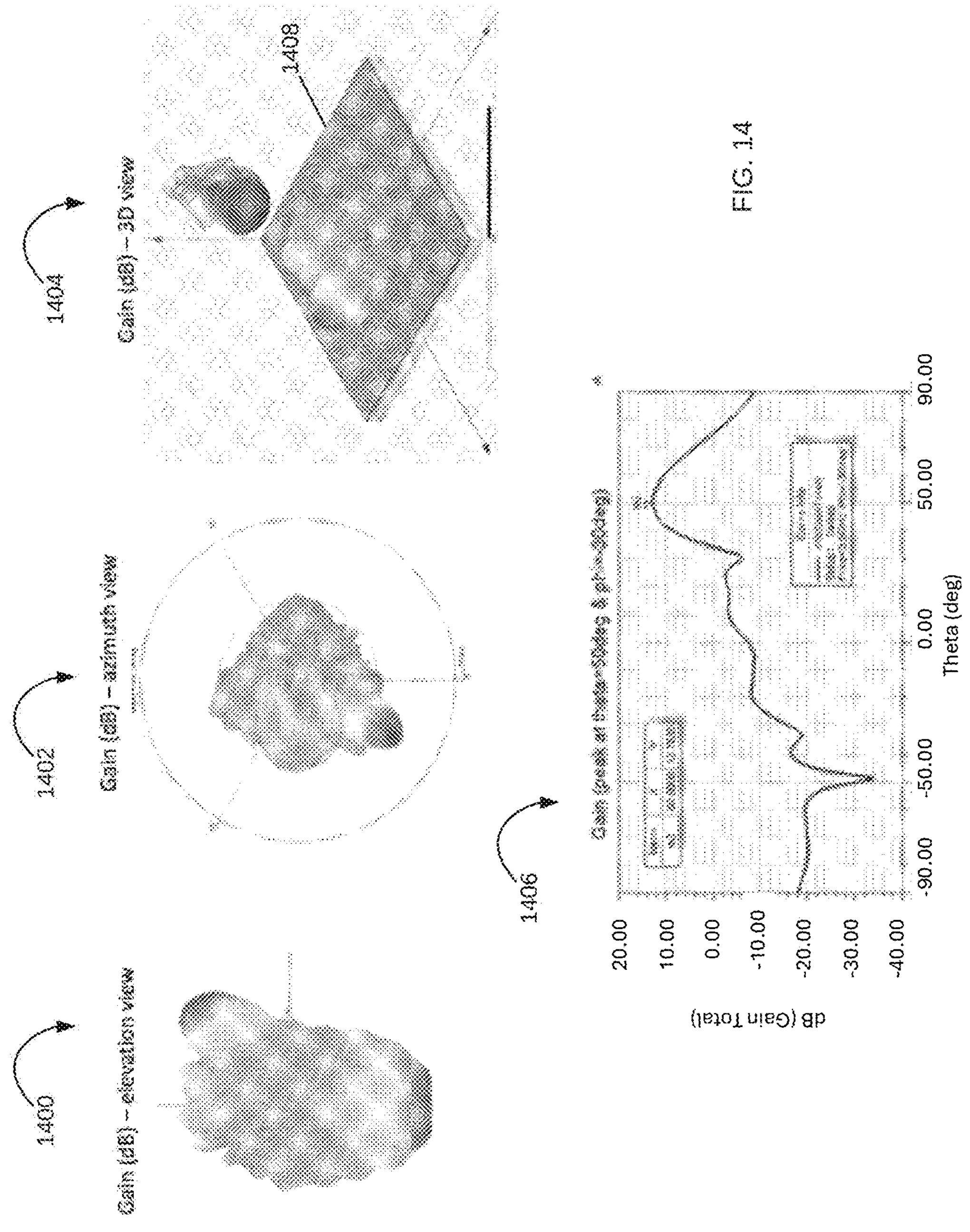
FIG. 14 are graphs of the gain of the reflectarray of FIG. 13.

The dimensions of the reflector elements in reflectarray 1300 are designed based on a desired progressive phase distribution 1314. In one example, reflectarray 1300 is at 0.4 m×0.4 m, with the smallest reflector element at 0.6 mm and the largest at 20.14 mm. A mask 1314 is determined by a look-up table of local phase values achievable with each dimension of a square patch as in this example. Mask 1316 results in a phase distribution 1318 that matches the desired phase distribution 516. FIG. 14 shows the gain of reflectarray 1300 in elevation (1400), azimuth (1402) and in a 3D 1404 view superimposed with the reflector elements 1408.

Figure 15:
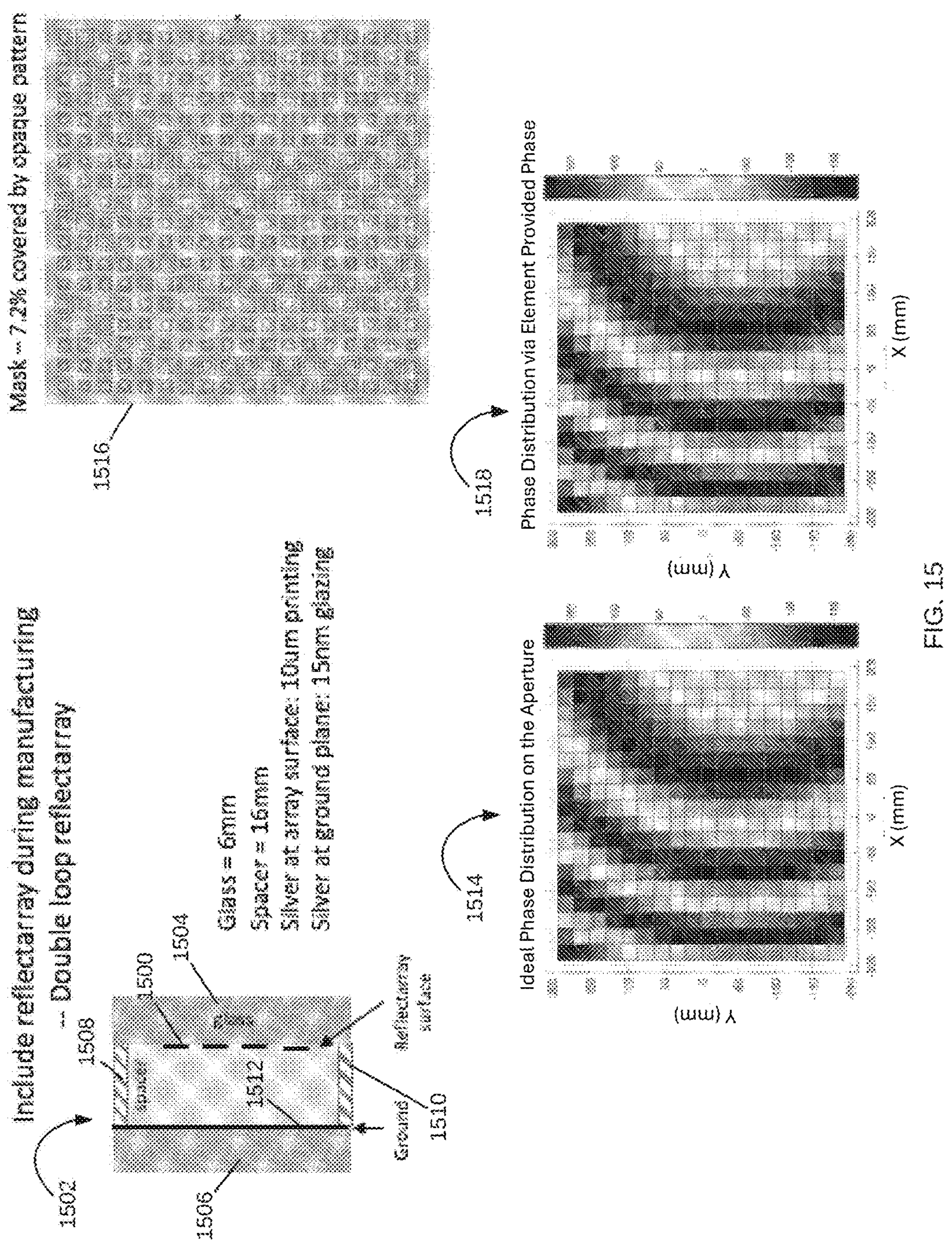
FIG. 15 is a schematic diagram of a reflectarray manufactured together with an IGU in accordance with various examples.

Attention is now directed to FIG. 15, which shows a schematic diagram of a reflectarray included into an IGU during manufacturing in accordance with various examples. Reflectarray 1500 is manufactured together with IGU 1502 and attached to top glass layer 1504 for 3.5 GHz applications. Glass layer 1504 and glass layer 1506 are in this example set at 6 mm, spacers 1508-1510 are at 16 mm, reflectarray 1500 is a silver layer printed on glass 1504 at 10 μm, and ground plane 1512 is a silver glazing layer at 15 nm. Note that these values are just an example and different dimensions may be selected in other configurations and applications.

Figure 16:
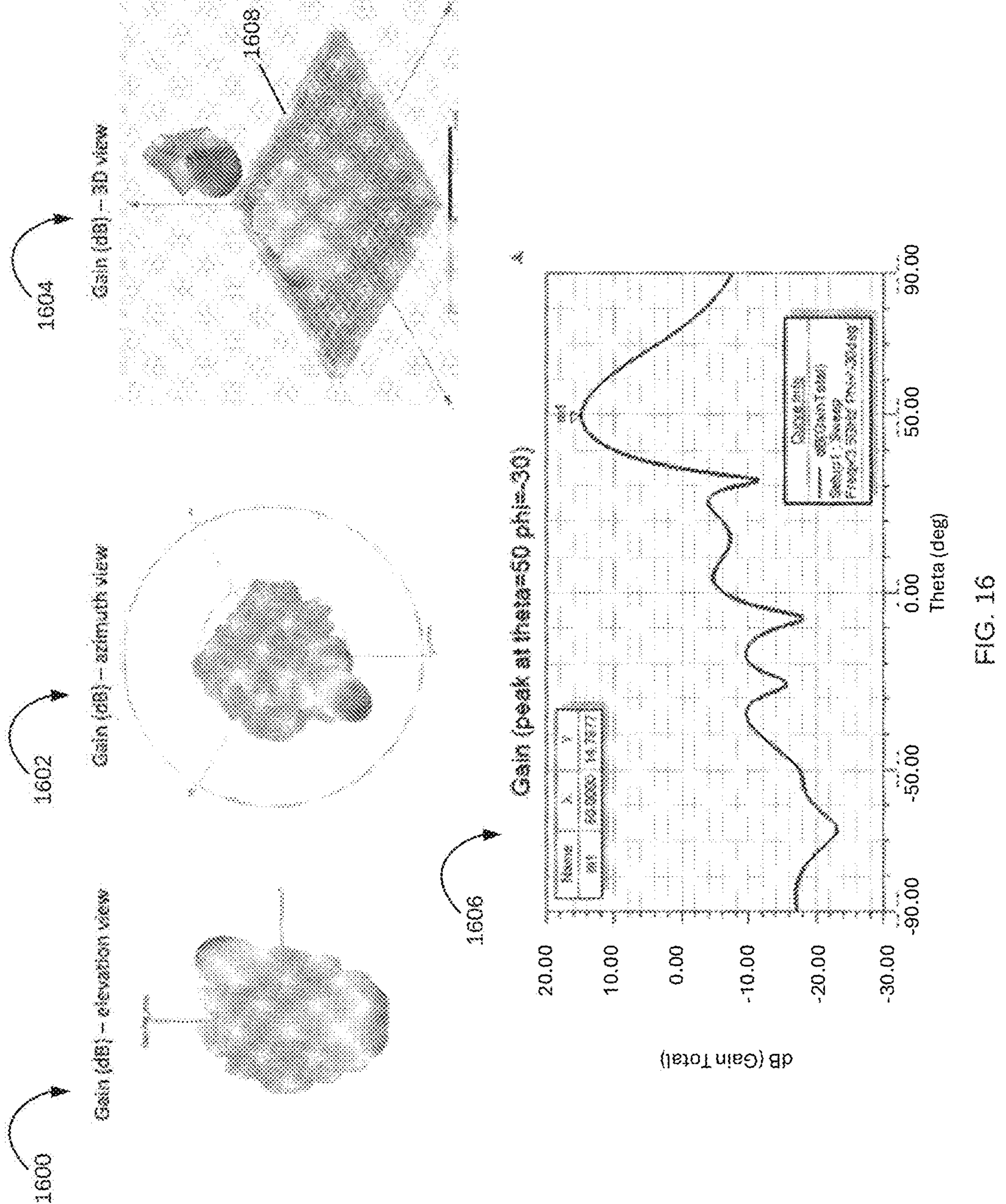
FIG. 16 are graphs of the gain of the reflectarray of FIG. 15.
Figure 17:
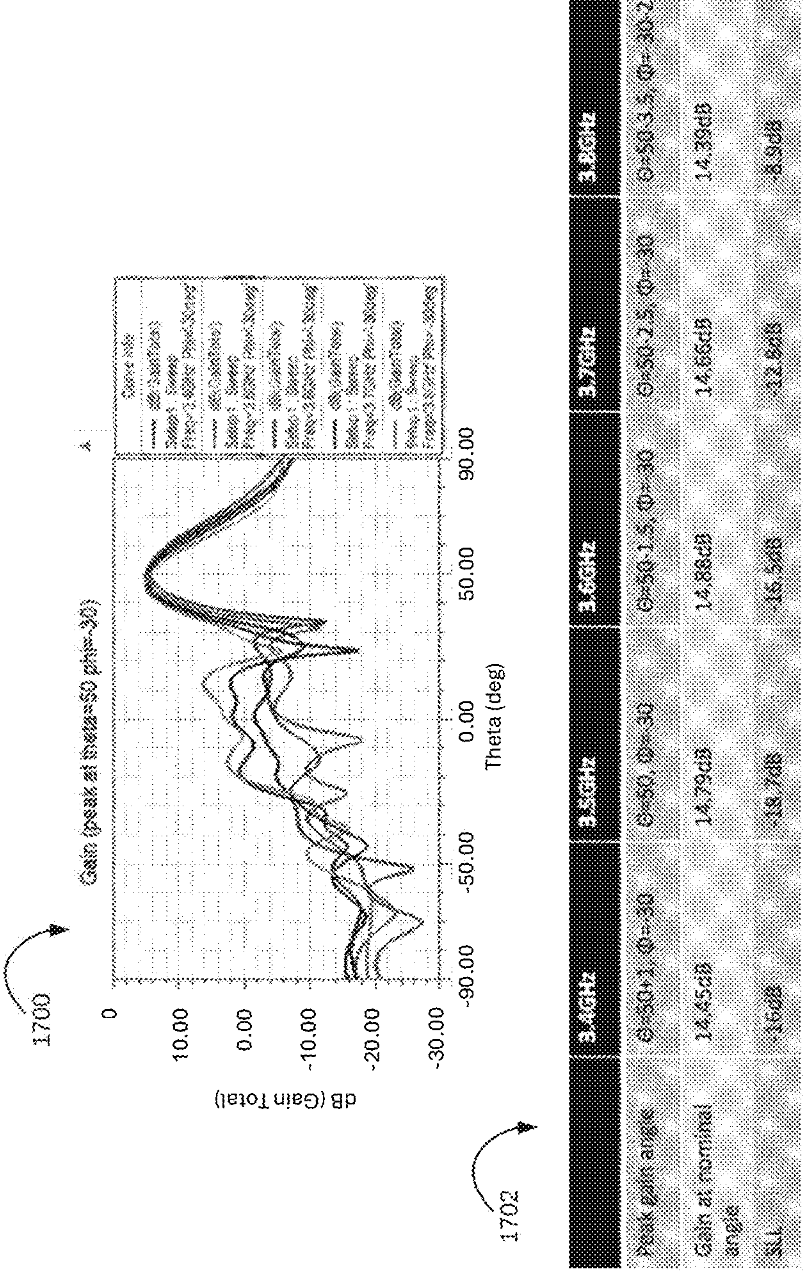
FIG. 17 are graphs of the peak gain location (both elevation and azimuth) and bandwidth performance of the reflectarray of FIG. 15.
Figure 18:
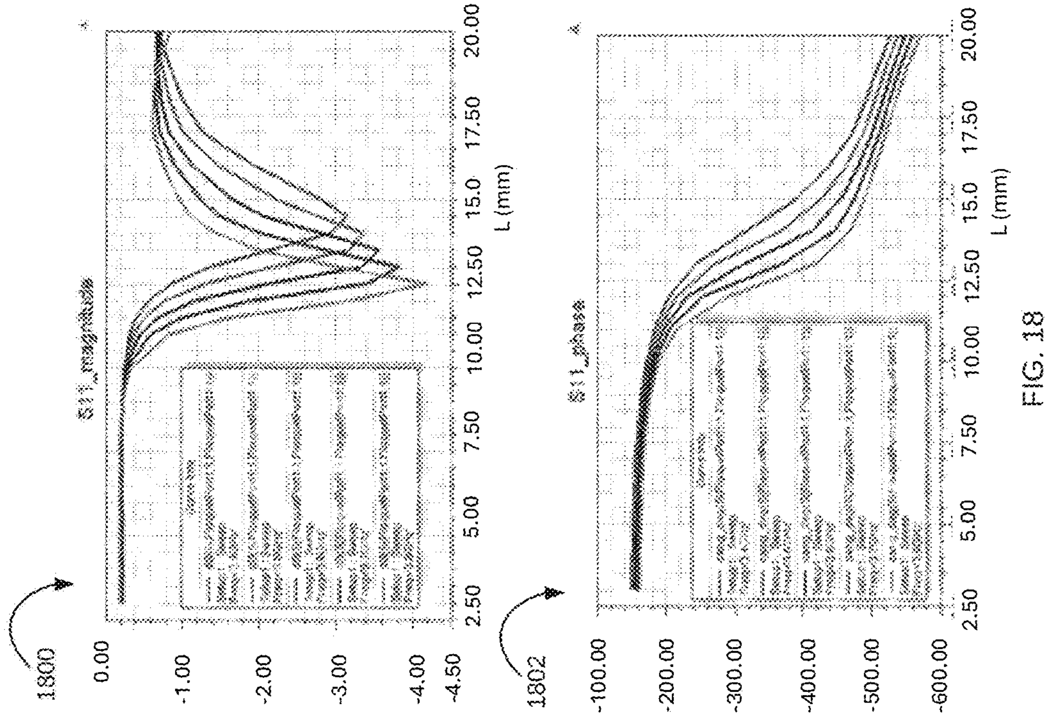
FIG. 18 are graphs showing the frequency variation of the reflection magnitude and phase of a reflector element in the reflectarray of FIG. 15.

Reflectarray 1500 has reflector elements that are double loop elements, similar to the reflectarray 900 of FIG. 9. The dimensions of the reflector elements in reflectarray 1500 are designed based on a desired progressive phase distribution 1514. A mask 1516 is determined by a look-up table of local phase values achievable with each dimension of a square patch as in this example. Mask 1516 results in a phase distribution 1518 that matches the desired phase distribution 1516. In this case, 7.2% of the mask is covered by an opaque pattern, resulting in a slightly reduced transparency as compared to reflectarray 500 of FIG. 5 and reflectarray 900 of FIG. 9. FIG. 16 shows the gain of reflectarray 1500 in elevation (1600), azimuth (1602) and in a 3D 1604 view superimposed with the reflector elements 1608. Graph 1606 shows the gain per phase and FIG. 17 shows the peak gain location of reflectarray 1500 for both elevation and azimuth in graph 1700 and bandwidth performance in graph 1702. FIG. 18 shows the frequency variation of the reflection magnitude (1800) and phase (1802) of a reflector element in the reflectarray 1500.

Figure 19:
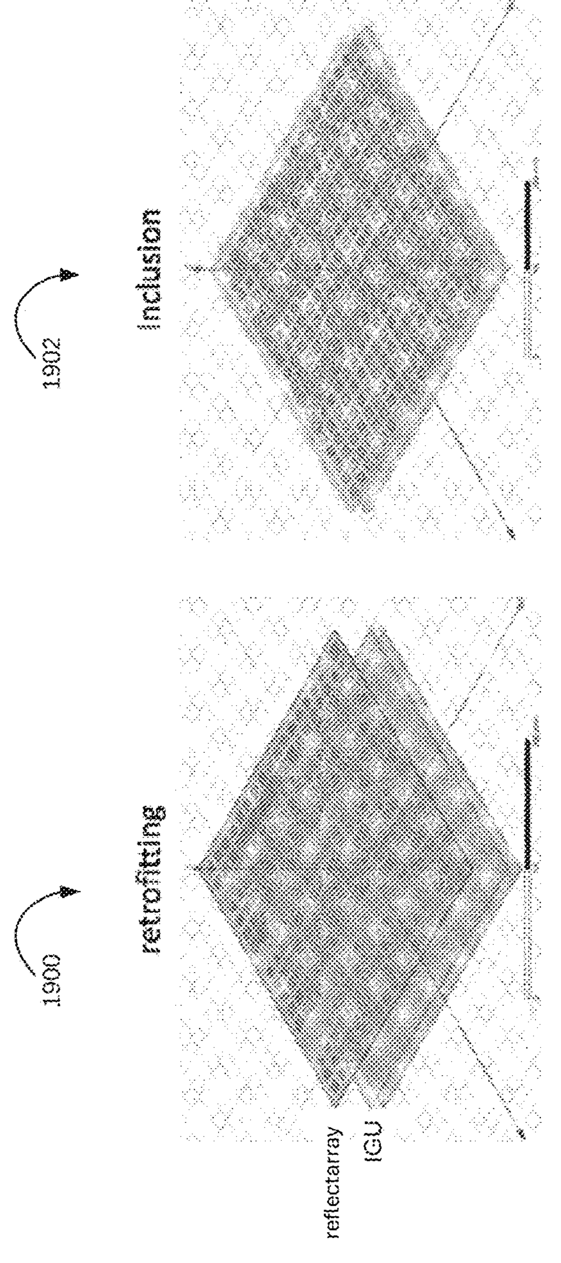
FIG. 19 shows a reflectarray retrofitted into an existing IGU and a reflectarray manufactured together with an IGU.

In various examples, reflectarrays 500, 900, 1300 and 1500 all provide great bandwidth performance and optical transparency for millimeter wave applications. Designs can be optimized for 3.5 GHz operation as shown with the designs of FIGS. 7, 11, 13 and 15, and also be implemented for 28 GHz or other frequencies, depending on the application. Larger arrays can be designed for higher efficiency, while considering phase linearity, frequency dispersion and optical transparency characteristics. Further, and as shown in FIG. 19, the designs described above can be either retrofitted to an existing IGU as in 1900, or manufactured together with the IGU as in 1902. Either design results in a reflectarray that enhances wireless communications in a 5G network, such as providing coverage to users in NLOS areas at a higher gain.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method for designing a reflectarray for use in an insulated glass unit (IGU), comprising:

determining a set of dimensions for the IGU, wherein the set of dimensions correspond to respective thickness of layers of the IGU;

computing a spatial phase delay from a feed antenna;

computing a progressive phase distribution for the reflectarray, the reflectarray comprising a metastructure array of reflector elements;

determining dimensions for each reflector element in the reflectarray based on the progressive phase distribution; and incorporating the reflectarray in the IGU, wherein the IGU comprises:

a first and a second glass layers;

a first and a second spacers;

a first and a second ground planes, the first ground plane in contact with the first glass layer and the second ground plane in contact with the second glass layer;

a gas layer disposed in between the first and the second ground planes; and a third glass layer disposed on top of the reflectarray.

2. The method of claim 1, wherein computing a spatial phase delay from a feed antenna comprises computing a spatial phase delay from a base station serving a wireless network, wherein the reflectarray reflects incident beams from the base station to users in the wireless network.

3. The method of claim 1, wherein the step of determining dimensions for each reflector element in the reflectarray based on the progressive phase distribution comprises determining the dimensions from a look-up table that pairs the dimensions for each reflector element to respective local phases to achieve the desired progressive phase distribution.

4. The method of claim 1, wherein each reflector element comprises a same or a different geometry and type from other reflector elements in the array.

5. The method of claim 1, wherein each reflector element in the metastructure array comprises one of a microstrip, a gap, a patch and a via.

6. The method of claim 1, wherein the step of incorporating the reflectarray in the IGU comprises attaching the reflectarray to an existing IGU.

7. The method of claim 1, wherein the step of incorporating the reflectarray in the IGU comprises manufacturing the reflectarray together with the IGU.

8. The method of claim 1, further comprising positioning the IGU on a building for reflection of electromagnetic signals.

9. The method as in claim 1, wherein computing the spatial phase delay comprises:

determining an angle of incidence for the IGU.

10. The method as in claim 9, wherein the step of determining dimensions for each reflector element comprises determining dimensions as a function of the angle of incidence to each reflector element so that electromagnetic waves reflect in a desired direction.

11. The method as in claim 10, wherein the step of determining dimensions for each reflector further comprises determining at least one geometrical parameter of each reflector element according to a phase value.

* * * * *